United States Patent

[11] 3,556,263

| [72] | Inventor | George F. Wieger |
| | | South Bend, Ind. |
| [21] | Appl. No. | 791,617 |
| [22] | Filed | Jan. 16, 1969 |
| [45] | Patented | Jan. 19, 1971 |
| [73] | Assignee | The Bendix Corporation |
| | | a corporation of Delaware |

[54] AUTOMATIC BRAKE SHOE POSITIONER MECHANISM
5 Claims, 6 Drawing Figs.

[52] U.S. Cl. .................................................... 188/79.5,
188/196
[51] Int. Cl. ......................................................F16d 51/52,
F16d 65/56
[50] Field of Search............................................
188/79.5GE, GT, GC, P, 196, P, RR

[56] References Cited
UNITED STATES PATENTS
2,875,860  3/1959  Eckardt et al. ............... 188/196(P)X 3,189,131  6/1965  Price ............................ 188/79.5(P)X
3,335,822  8/1967  Edwards...................... 188/79.5(GT)

*Primary Examiner*—Duane A. Reger
*Attorneys*—C. F. Arens and Plante, Arens, Hartz, Hix and Smith

ABSTRACT: A drum brake is disclosed which includes a mechanism that properly positions the brake shoes with respect to the drum to maintain the proper clearance between the shoes and the drum. The mechanism includes a linkage slidably mounted on the fixed support and connected to one of the shoes so that movement of the shoes in excess of a predetermined amount slides the linkage with respect to the support. The linkage includes a pair of members which move together as a unit during forward braking but which move relative to each other during reverse braking to insure that the brake shoes are repositioned during forward braking only.

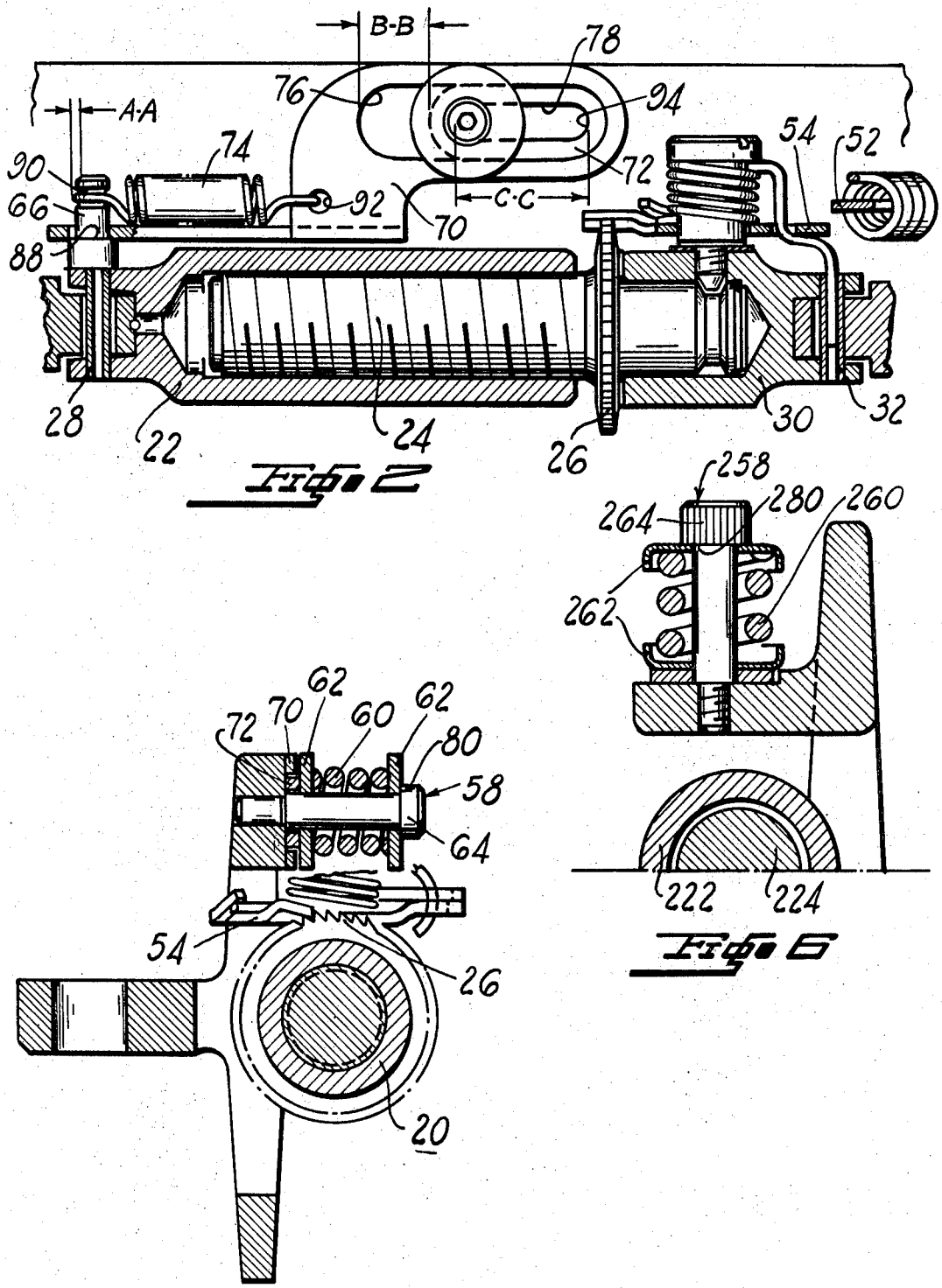

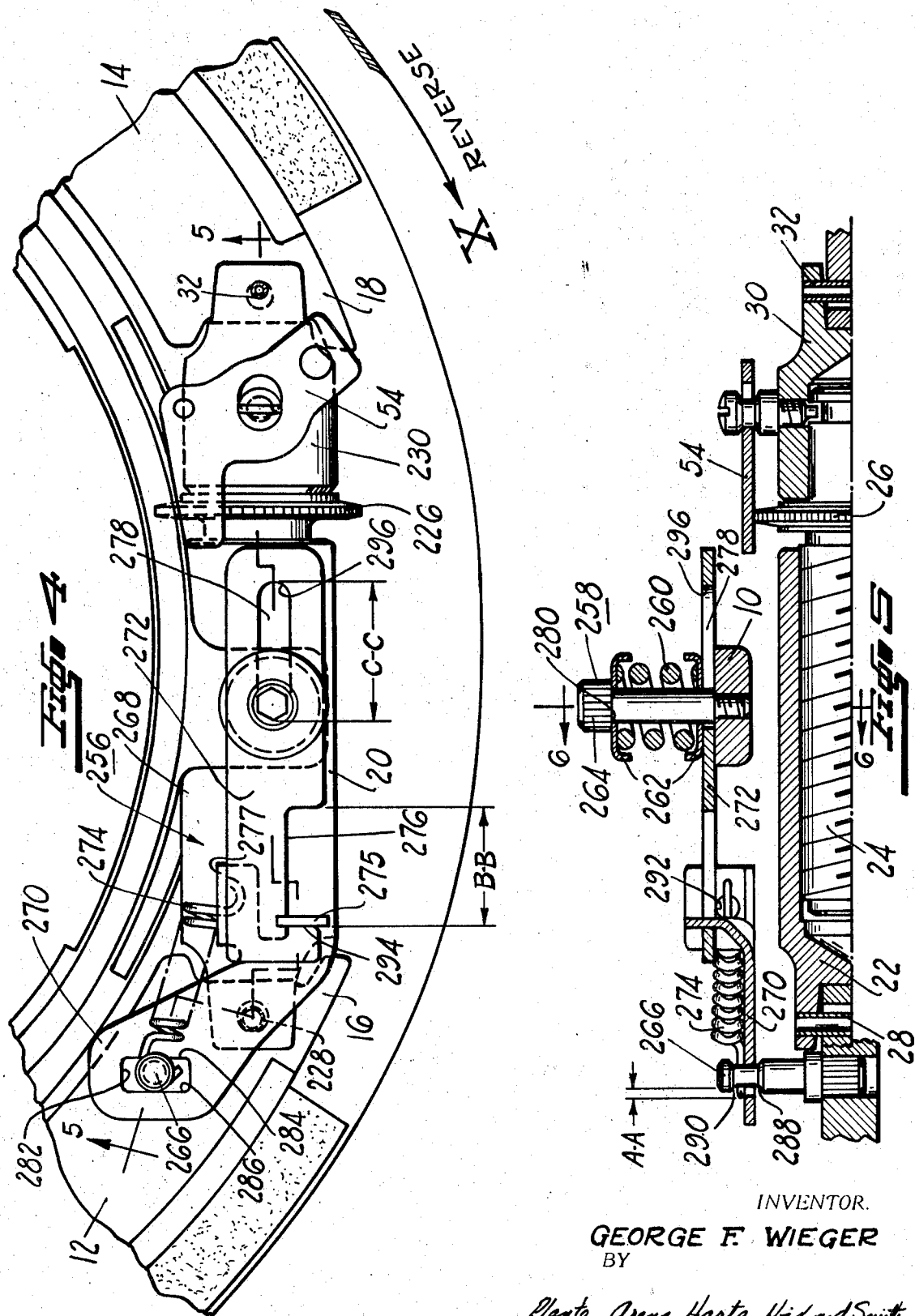

AUTOMATIC BRAKE SHOE POSITIONER MECHANISM

BACKGROUND OF THE INVENTION

The invention concerns an automatic brake shoe centralizer or positioner mechanism of the variety required for use in association with a drum-type brake where the shoes are substantially free to pivot about the brake actuator. Specifically, the actuator is conventionally mounted at the top of the brake support or backing plate and thus, is aligned with the vertical centerline of the fixed axle to which the backing plate is rigidly attached. However, installations of the brake assembly on a vehicle may require rotation of the actuator mounting point in either direction from the conventional mounting point to facilitate mechanical or hydraulic connections thereto. This rotation of the brake assembly allows the brake shoes to drag against the drum of the brake assembly which results in premature lining wear and compromises braking effectiveness.

SUMMARY OF THE INVENTION

It is an object of this invention to provide a drum-type brake with an automatic brake shoe positioner mechanism to compensate for lining wear.

It is an object of this invention to provide a drum-type brake with an automatic brake shoe positioner mechanism which adjusts the brake shoes during brake application.

It is an object of this invention to provide a smaller, more compact, structural concept for accomplishing automatic positioning.

It is an object of this invention to provide an automatic positioner mechanism that will allow rotation of the brake assembly in either direction from the conventional vertical centerline of the fixed n member or axle while maintaining the proper running clearance between the brake shoes and the drum of the brake assembly.

The above-mentioned and other features and objects of this invention and the manner of obtaining them will become more apparent and the invention itself will be best understood by reference to the following description of embodiments of the invention taken in conjunction with the accompanying drawings.

BRIEF DESCRIPTION OF THE DRAWINGS

FIG. 2 is a view taken along section 2–2 of FIG. 1;

FIG. 3 is a view taken along section 3–3 of FIG. 1;

FIG. 4 is a fragmented view of a modified form of the embodiment illustrated in FIG. 1;

FIG. 5 is a view taken along section 5–5 of FIG. 4; and

FIG. 6 is a view taken along section 6–6 of FIG. 5.

DESCRIPTION OF THE PREFERRED EMBODIMENT

Figure 1:
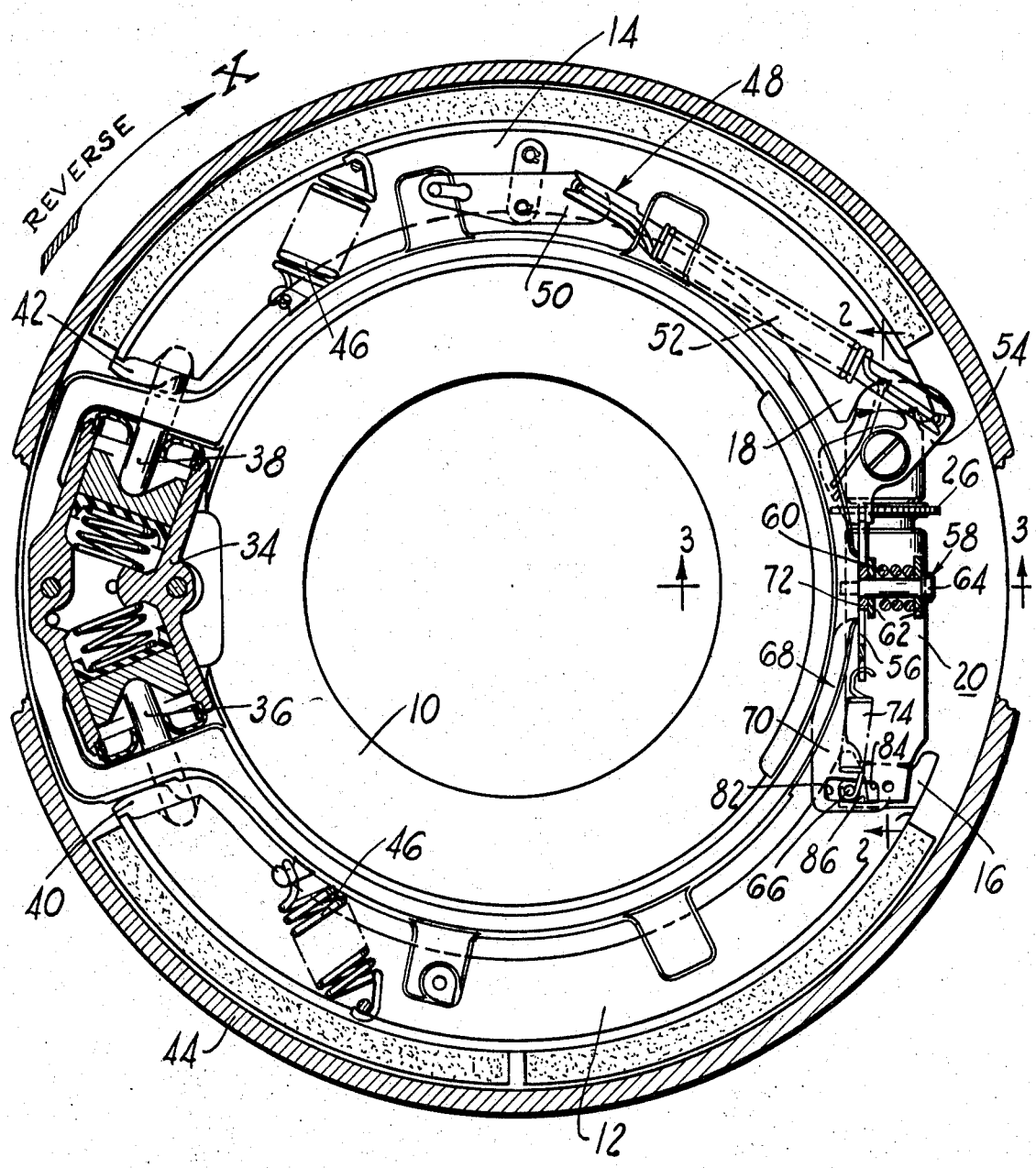
FIG. 1 is an elevational view of a brake illustrating one embodiment of the invention.

Referring now to the drawings, and specifically FIG. 1, a backing plate or support 10 is adapted to be mounted to a fixed part of a vehicle such as an axle flange (not shown). A pair of brake shoes 12 and 14 is slidably mounted on the backing plate and is interconnected at one pair of adjacent ends 16 and 18 by an adjuster mechanism 20 which comprises an adjusting screw nut 22 and a rotatable adjusting screw 24 having a rotatable serrated wheel 26 integral therewith. The adjusting screw nut 22 is pivotally fixed to the end 16 of the brake show 12 by means of pin 28 and the adjusting screw 24 is rotatably mounted in a cap member 30 which is pivotally fixed to the end 18 of the brake shoe 14 by a pin 32. An actuator means 34 is rigidly fixed to the backing plate 10 and has connecting links 36 and 38 which are connected to the other ends 40 and 42 of the brake shoes 12 and 14, respectively. The links are, of course, connected to the webs of each shoe for spreading the shoes into engagement with a brake drum 44 in response to fluid pressurization of the actuator means 34. Backing plate to shoe return springs 46, which may be suitably located on both sides of each shoe, serve to retract the brake shoes against the actuator means 34, to their brake release position.

An automatic adjusting mechanism 48 is provided to work in cooperation with the rotatable serrated wheel 26 and comprises a force transmitting member 50, an overtravel or connecting means 52 and a pawl member 54. The automatic adjusting mechanism 48 will operate upon a braking application and cause the adjuster mechanism 20 to rotatably expand axially in response to lining wear. A detailed explanation of the operation of the automatic adjusting mechanism 48 is given in U.S. Pat. application Ser. No. 793,385, filed Jan. 23, 1969. Although shown in FIG. 1, it is noted that the subject invention will operate satisfactorily without the automatic adjusting mechanism 48 and the adjuster mechanism 20. However, it is of course necessary to have interconnecting linkage structure connecting ends 16 and 18 of shoes 12 and 14, respectively.

Positioning means 56 is operatively interposed between said support 10 and said brake shoe 12 to prevent said shoe 12 from dragging against the brake drum 44, and to further provide a predetermined running clearance between the brake shoe 12 and the drum 44. The positioning means 56 is comprised of a retainer means 58 including a coil spring 60, a pair of cap members 62 and a retainer bolt 64; an abutment means 66; a linkage means 68 including a first member 70 and a second member 72; and a resilient means 74. The first member 70 has on one end a slot 76 which slidingly receives the second member 72. The second member 72 has a slot 78 which cooperates with the retainer means 58 to adjustably secure the linkage means 68 to the backing plate or support 10. As may best be seen in FIGS. 1 and 3, one of the cap members 62 abuts a flange 80 of the retainer bolt 64. The coil spring 60 and other cap member 62 are suitably installed on the retainer bolt 64 prior to the retainer bolt 64 being threadably installed in the backing plate 10. The coil spring 60 in cooperation with the cap members 62 and the flange 80 of the retainer bolt 64 exerts a predetermined axial force against said second member 72. In view of the fact that the second member 72 is thicker than the first member 70, the retainer means 58 does not preload said first member 70, and thus said first member 70 retains longitudinal freedom to slide with respect to said second member 72. The other end of said first member 70 is formed in a plane substantially at right angles to said one end and has therein a transverse slot 82 including an inward side 84 and an outward side 86 for cooperation with said abutment means 66. The abutment means 66 is suitably rigidly secured to end 16 of the brake shoe 12 and has an annular ledge 88 against which said first member 70 rests. Resilient means or coil spring 74 has one end secured in an annular groove 90 of the abutment means 66 and its other end secured in a hole 92 of said first member 70 to maintain contact between abutment means 66 and the inward side 84 of the transverse slot 82 during the brake released position.

Although the positioning means has been shown in association with brake shoe 12, which only operates to adjust said positioning means 56 as the brakes are applied traveling in a reverse direction, the positioning means could equally be installed to operate with brake shoe 14 and thus adjust for lining wear and clearance as the vehicle is braked going in a forward direction.

MODE OF OPERATION OF THE PREFERRED EMBODIMENT

Upon brake application by actuation of the actuator means 34, and assuming rotation of the brake drum 44 in the direction of arrow X, the shoes 12 and 14 will be spread until they engage the brake drum 44 at which time the brake drum will tend to carry shoe 12 so as to cause its end 40 to anchor against the actuator means 34 through linkage 36. The actuator means 34 will further exert a force through linkage 38 on end 42 of the brake shoe 14 causing it to frictionally engage the drum 44 and exert a force through the adjuster mechanism 20 to the brake shoe 12 to assist it in frictionally engaging the drum 44. As the brakes are applied and the brake shoes move toward the brake drum 44, the abutment means 66 will move away from inner side 84 of the transverse slot 82 and engage the outer side 86. The distance that the abutment means 66 moves is best shown in FIG. 2 wherein this distance is designated by the letter A. Moreover, the distance A which the abutment means 66 moves upon brake actuation, is directly proportional to the desired running clearance between the lining of shoe 12 and the brake drum 44. Upon release of the brakes, the two return springs 46 will return shoes 12 and 14 to their respective brake released positions and resilient means 74 will retract the abutment means to again engage the inward side 84 of the transverse slot 82. If after a number of brake applications, the lining associated with brake shoe 12 has experienced sufficient wear, the abutment means 66 will upon engagement with the outward side 86 of the transverse slot 82 cause said first member 70 to longitudinally move said second member 72 with respect to said retainer means 58. Upon subsequent wear of said brake shoe 12 said linkage means 68 will continue to adjust longitudinally until an end 94 of the slot 78 abuts the retainer bolt 64 at which time, of course, the brake shoes will be worn to a point that replacement is necessary. Thus it can be seen that the length of slot 78, designated by letter C in FIG. 2, is predetermined to provide the necessary longitudinal adjustability to accommodate the anticipated operational life of the brake shoes 12 and 14.

Upon application of the actuator means 34, assuming rotation of the brake drum 44 in the forward direction, and thus opposite to the arrow shown, the brake shoes 12 and 14 will again be spread until they engage the brake drum 44 at which time the brake drum will tend to carry shoe 14 so as to cause its end 42 to anchor against the actuator means through the linkage 38. The actuator means 34 will further exert a force through linkage 36 on end 40 of the brake shoe 12 causing it to frictionally engage the drum 44 and exert a force through the adjuster mechanism 20 to the brake shoe 14 to assist it in frictionally engaging the drum 44. To avoid disrupting the longitudinal adjustment previously made by said positioning means 56, said first member 70 has longitudinal freedom with respect to said second member 72 as designated by letter B, shown in FIG. 2. Upon braking in the forward direction said first member 70 simply slides toward the right as shown in FIG. 2, leaving undisturbed the previously made adjustment of said second member 72 with respect to said retainer means 58. Upon release of the brakes the first member 70 will return toward the left and again engage the outer periphery of said second member 72.

Referring again to FIG. 1, the transverse slot 82 has a predetermined length to accommodate the various positions of the abutment means 66 that result from wear of the lining of brake shoe 12 and the position of the linkage means 68 as it is longitudinally adjusted in response to lining wear of said brake shoe 12.

DESCRIPTION OF THE MODIFIED EMBODIMENT

In the alternate embodiment, those parts which are identical to corresponding parts of the preferred embodiment, will be given the same identifying numbers. Those parts of the alternate embodiment having corresponding parts in the preferred embodiment, but which are of different construction, size, or shape; will be given the same number as its counterpart with the number 200 added thereto.

Referring now to the modified embodiment of the invention shown in FIG. 4, a substantial portion of the backing plate and other operable elements of the brake are not shown, however, it is assumed that their structure and function would remain the same for the modified embodiment, as shown in FIG. 1. A backing plate or support 10 is as in the preferred embodiment adapted to be mounted to a fixed part of a vehicle such as an axle flange (not shown). A pair of brake shoes 12 and 14 is slidably mounted on the backing plate and is interconnected at one pair of adjacent ends 16 and 18 by an adjuster mechanism 20 which comprises an adjusting screw nut 22 and a rotatable adjusting screw 24 having a rotatable serrated wheel 26 integral therewith. The adjusting screw nut 22 is pivotally fixed to the end 16 of the brake shoe 12 by means of the pin 28 and the adjusting screw 24 is rotatably mounted in a cap member 30 which is pivotally fixed to the end 18 of the brake shoe 14 by pin 32. An actuator means 34 is rigidly fixed to the backing plate 10 and has connecting links 36 and 38 for operation with the brake shoes 12 and 14, respectively, as explained in the preferred embodiment. The return springs 46, may again be suitably located on both sides of said brake shoes to retract the brake shoes against the actuator means 34 after a braking application.

An automatic adjusting mechanism 48, as shown in the preferred embodiment, may be provided to work in cooperation with the rotatable serrated wheel 26 to adjust the position of said brake shoes 12 and 14 as lining wear is experienced.

Specifically referring now to FIGS. 4 and 5, a positioning means 256 is operatively interposed between said support 10 and said brake shoe 12 to prevent said shoe 12 from dragging against the brake drum 44 and to further provide a predetermined running clearance between the brake shoe 12 and the drum 44. The positioning means 256 is comprised of a retainer means 258 including a coil spring 260, a pair of cap members 262 and a retainer bolt 264; an abutment means 266; a linkage means 268 including a first member 270 and a second member 272; and a resilient means 274. The first member 270 has on one end a raised portion 275 which slidably cooperates with slot 276 of said second member 272 to provide for longitudinal adjustability. Said first member 270 further has a raised portion 277 to assure continuous alignment of said raised portion 275 with the slot 276. The second member 272 has a slot 278 which cooperates with the retainer means 258 to adjustably secure linkage means 268 to the backing plate or support 10. As may best be seen in FIG. 5, one of the cap members 262 abuts a flange 280 of the retainer bolt 264. The coil spring 260 and other cap member 262 are suitably installed on the retainer bolt 264 prior to the retainer bolt 264 being threadably installed in the backing plate 10. The coil spring 260 in cooperation with the cap members 262 and the flange 280 of the retainer bolt 264 exerts a predetermined axial force against said second member 272. The other end of said first member 270 has therein a transverse slot 282 including an inward side 284 and an outward side 286 for cooperation with said abutment means 266. The abutment means 266 is suitably rigidly secured to the end 16 of the brake shoe 12 and has an annular ledge 288 against which said first member 270 rests. Resilient means or coil spring 274 has one end secured intermediate said first member 270 and an annular ledge 290 of said abutment means 266 and its other end secured in a hole 292 in said raised portion 277 of said first member 270 to maintain positive contact between abutment means 266 and the inward side 284 of a transverse slot 282 bearing the brake released position.

MODE OF OPERATION OF THE MODIFIED EMBODIMENT

Upon brake application by actuation of the actuator means 34, and assuming rotation of the brake drum 44 in the direction of arrow A, the shoes 12 and 14 will be spread until they engage the brake drum 44 at which time the brake drum will tend to carry shoe 12 into and against the actuator means 34. The actuator means 34 will further exert a force on the brake shoe 14 causing it to frictionally engage the drum 44 and exert a force through the adjuster mechanism 20 to the brake shoe 12 to assist it in frictionally engaging the drum 44. As the brakes are applied and the brake shoes move toward the brake drum 44, the abutment means 266 will move away from the inner side 284 of the transverse slot 282 and engage the outer side 286 of transverse slot 282. The distance that the the abutment means 266 moves is best shown in FIG. 5, wherein this distance is designated by the letters AA. Moreover, the distance AA which the abutment means 266 moves upon brake application, is directly proportional to the desired running clearance between the lining of shoe 12 and the brake drum 44. Upon release of the brake, the brake shoes 12 and 14 will be returned to their brake release positions and resilient means 274 will retract the abutment means to again engage the inward side 284 of the transverse slot 282. If after a number of brake applications, the lining associated with the brake shoe 12 has experienced sufficient wear, the abutment means 266 will upon engagement with the outward side 286 of the transverse slot 282 cause said raised portion 275 of said first member 70 to engage end 294 of said slot 276 to longitudinally move said second member 272 with respect to said retainer means 278. Upon subsequent wear of said brake shoe 12 said linkage means 268 will continue to adjust longitudinally until an end 296 of the slot 278 abuts the retainer bolt 264 at which time, of course, the brake shoes will be worn to a point that replacement is necessary. Thus, it can be seen that the length of slot 278, designated by letter CC in FIG. 4, is predetermined to provide the necessary longitudinal adjustability to accommodate the anticipated operational life of the brake shoes 12 and 14.

The actuation of this brake when the drum 44 is rotated in a forward direction is the same as that explained in the preferred embodiment. Thus, to avoid disrupting the longitudinal adjustment previously made by said positioning means 256, said first member 270 has longitudinal freedom with respect to said second member 272 as designated by letter BB shown in FIG. 4. Upon braking in the forward direction, said first member 270 simply slides toward the right leaving undisturbed the previously made adjustment of said second member 272 with respect to said retainer means 258. Upon release of the brakes said first member 270 will return toward the left and raised portion 275 will again engage end 294 of slot 276.

Referring briefly again to FIG. 4, the transverse slot 282 has a predetermined length to accommodate the various positions of the abutment means 266 that result from wear of the lining of brake shoe 12 and the position of other linkage means 268 as it is longitudinally adjusted in response to lining wear of said brake shoe 12.

While the specific details have been herein shown and described, the invention is not confined thereto, as other substitutions can be made within the spirit and scope of the invention.

I claim:
1. In a brake:
a drum mounted for rotation with a member to be braked;
a fixed support;
a pair of brake shoes slidably mounted on said fixed support for movement toward and away from said drum; and
positioning means interconnecting one of said shoes and said fixed support to insure proper spacing between the one shoe and the fixed support when the brake is released;
said positioning means including a linkage having a pair of members, one of said members being slidably mounted on said fixed support, said one member being operatively connected to the other member for movement with the latter when the other member moves in one direction, but permitting the other member to move relative to the one member when the other member moves in the opposite direction, and means securing said other member to said one shoe.

2. The invention of claim 1:
said other member having an elongated opening formed therein;
said securing means including abutment means mounted on said one shoe extending through said opening and resilient means interconnecting the other member and the abutment means to yieldably urge the latter toward one end of the elongated opening.

3. The invention of claim 1 and retainer means yieldably urging said one member into frictional engagement with said fixed support to retard relative sliding motion between the fixed support and said one member.

4. The invention of claim 2:
said other member having a slot formed therein;
said one member being slidably disposed within said slot;
one end of said one member normally engaging one end of the slot to permit movement of said other member in said one direction to slide the one member on the fixed support;
said one end of said slot sliding away from said one member when the other member moves in the opposite direction.

5. The invention of claim 2:
one side of said one member having a recessed portion presenting an elongated sliding surface and an abutment surface;
said other member having a raised portion slidably engaging said sliding surface and normally positioned to engage said abutment surface whereby movement of the other member in said one direction is transmitted to said one member;
said raised portion sliding along said sliding surface when the other member moves in the opposite direction.